United States Patent
Liu

(10) Patent No.: US 10,101,835 B2
(45) Date of Patent: Oct. 16, 2018

(54) EMBEDDED TOUCH-SCREEN DISPLAY PANEL STRUCTURE

(71) Applicant: HON HAI PRECISION INDUSTRY CO., LTD., New Taipei (TW)

(72) Inventor: Chia-Lin Liu, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 367 days.

(21) Appl. No.: 14/849,800

(22) Filed: Sep. 10, 2015

(65) Prior Publication Data

US 2016/0283003 A1 Sep. 29, 2016

(30) Foreign Application Priority Data

Mar. 26, 2015 (TW) .............................. 104109784 A

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01)

(58) Field of Classification Search
CPC .................. G06F 3/0412; G06F 3/044; G06F 2203/04103
See application file for complete search history.

(56) References Cited

U.S. PATENT DOCUMENTS

| | | | |
|---|---|---|---|
| 2014/0210772 A1* | 7/2014 | Yang ................... | G06F 1/3262 345/174 |
| 2014/0362029 A1* | 12/2014 | Mo ....................... | G06F 3/044 345/174 |
| 2015/0177881 A1* | 6/2015 | Chen .................... | G06F 3/044 345/174 |
| 2016/0004346 A1 | 1/2016 | Zhao | |
| 2016/0253030 A1* | 9/2016 | Tada .................... | G06F 3/041 345/174 |

FOREIGN PATENT DOCUMENTS

CN 103699284 A 4/2014

* cited by examiner

*Primary Examiner* — Aneeta Yodichkas
(74) *Attorney, Agent, or Firm* — ScienBiziP, P.C.

(57) ABSTRACT

An embedded touch-screen display panel structure for an electronic device includes a common electrode layer and a pixel electrode layer. The common electrode layer includes a number of sensing electrodes and a plurality of drive lines. Each of the sensing electrodes operating in a display mode receives a common voltage to cooperatively induce an electric field with corresponding pixel electrodes of the pixel electrode layer to drive corresponding liquid crystals of a liquid crystal display to rotate to carry out display functions of the display panel structure. Each of the sensing electrodes operating in a touch-sensing mode cooperatively carries out touch-sensing functions of the display panel structure with corresponding drive lines. The sensing electrodes and the drive lines are arranged in a same plane of the common electrode layer.

8 Claims, 6 Drawing Sheets

EMBEDDED TOUCH-SCREEN DISPLAY PANEL STRUCTURE

FIELD

The subject matter herein generally relates to display panels, and more particularly to an embedded touch-screen display panel having a common electrode layer operable in a display mode and a touch-sensing mode of the display panel.

BACKGROUND

Embedded touch-screen display panels are widely used in electronic devices. The embedded touch-screen display panel requires corresponding structures to sense touch operations on the display panel and to display on the display panel.

BRIEF DESCRIPTION OF THE DRAWINGS

Implementations of the present technology will now be described, by way of example only, with reference to the attached figures.

DETAILED DESCRIPTION

Figure 1:
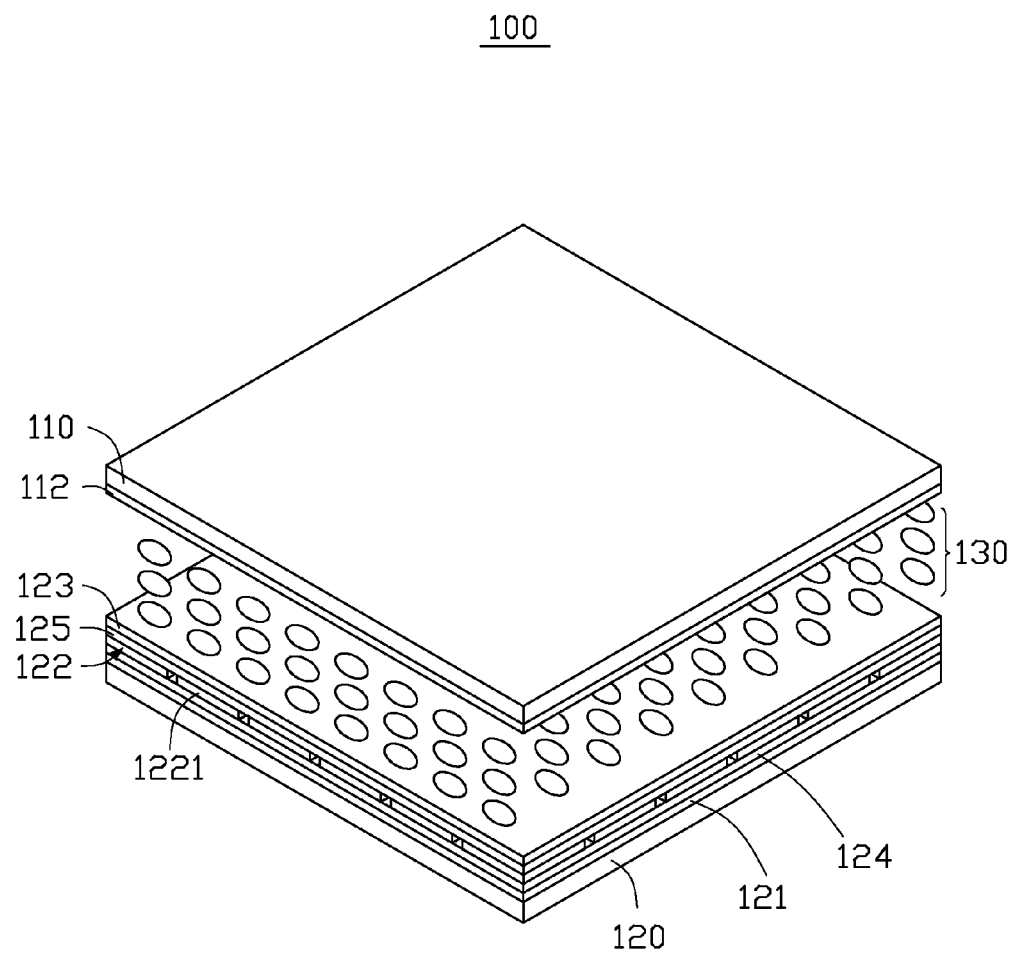
FIG. 1 is an isometric view of an embodiment of an embedded touch-screen display panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of an embedded touch-screen display panel structure 100 (hereinafter the "display panel structure 100"). The display panel structure 100 can include a common electrode layer 122 and a pixel electrode layer 123. The common electrode layer 122 can be operable in a display mode and a touch-sensing mode. In the display mode, the common electrode layer 122 and the pixel electrode layer 123 can cooperatively induce an electric field for controlling liquid crystals of a liquid crystal layer 130 to rotate. In the touch-sensing mode, the common electrode layer 122 can carry out touch-sensing functions of the display panel structure 100.

Figure 2:
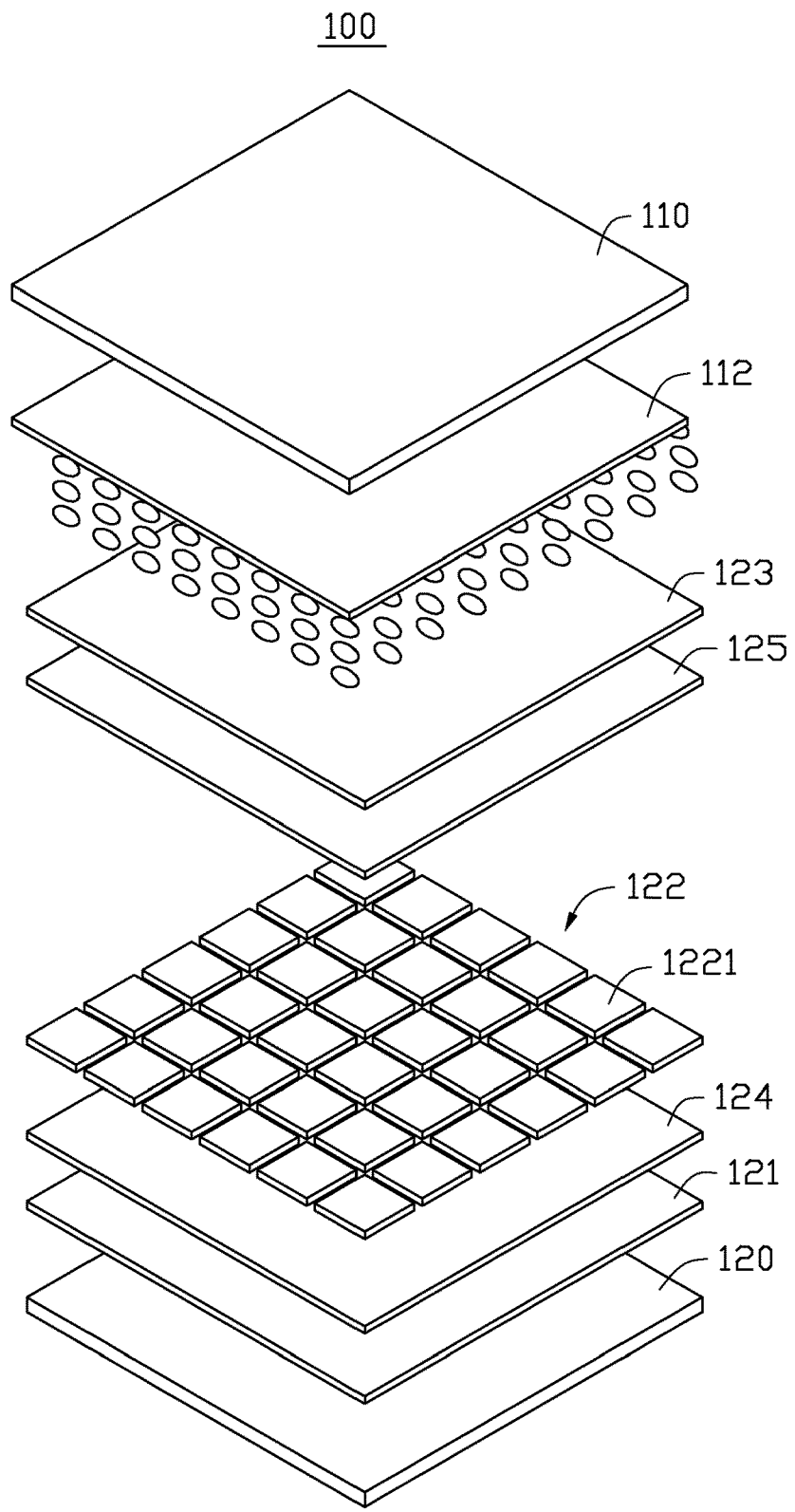
FIG. 2 is an exploded view of FIG. 1.

Referring to FIG. 2, the display panel structure 100 can further include a first substrate 110, a second substrate 120 spaced from the first substrate 110, a color filter 112, a display driver layer 121, a first insulating layer 124, and a second insulating layer 125. The common electrode layer 122 can include a plurality of sensing electrodes 1221. The display driver layer 121 can include a plurality of thin film transistors 1213 (shown in FIG. 3), and the pixel electrode layer 123 can include a plurality of pixel electrodes 1231 (shown in FIG. 3). Each pixel electrode 1231 can electrically couple to a corresponding one thin film transistor 1213 through corresponding vias defined through the first insulating layer 124 and the second insulating layer 125. In at least one embodiment, the first substrate 110 is a color filter substrate, and the second substrate 120 is an array substrate.

Figure 3:
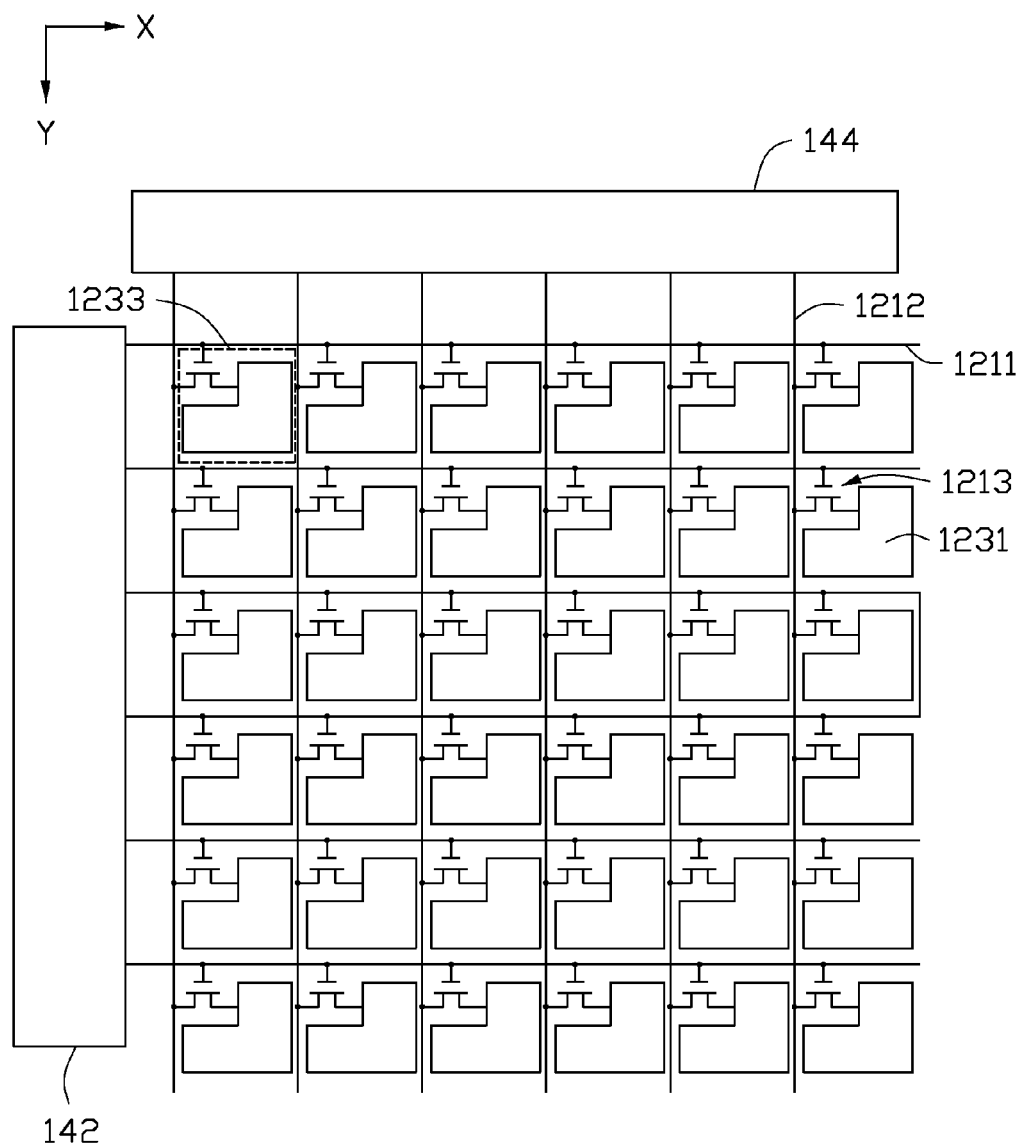
FIG. 3 is a circuit diagram of a pixel electrode layer and a display driver layer of FIG. 1.

Referring to FIG. 3, the pixel electrodes 1231 and the corresponding thin film transistors 1213 can form a plurality of pixel display areas 1233. Each pixel display area 1233 can include one corresponding pixel electrode 1231 electrically coupled to the corresponding thin film transistor 1213. The plurality of pixel display areas 1233 can be arranged in a plurality of rows. A plurality of scan lines 1211 can extend from a scan driving circuit 142, and a plurality of data lines 1212 can extend from a data driving circuit 144. The scan driving circuit 142 can transmit scan signals along the scan lines 1211, and the data driving circuit 144 can transmit data signals along the data lines 1212. The thin film transistors 1213 can receive scan signals from the plurality of scan lines 1211, and the pixel electrodes 1231 can receive data signals from the plurality of data lines 1212. In at least one embodiment, the scan lines 1211 can extend along a first direction X, and the data lines 1212 can extend along a second direction Y. The first direction X can be substantially perpendicular to the second direction Y.

Figure 4:
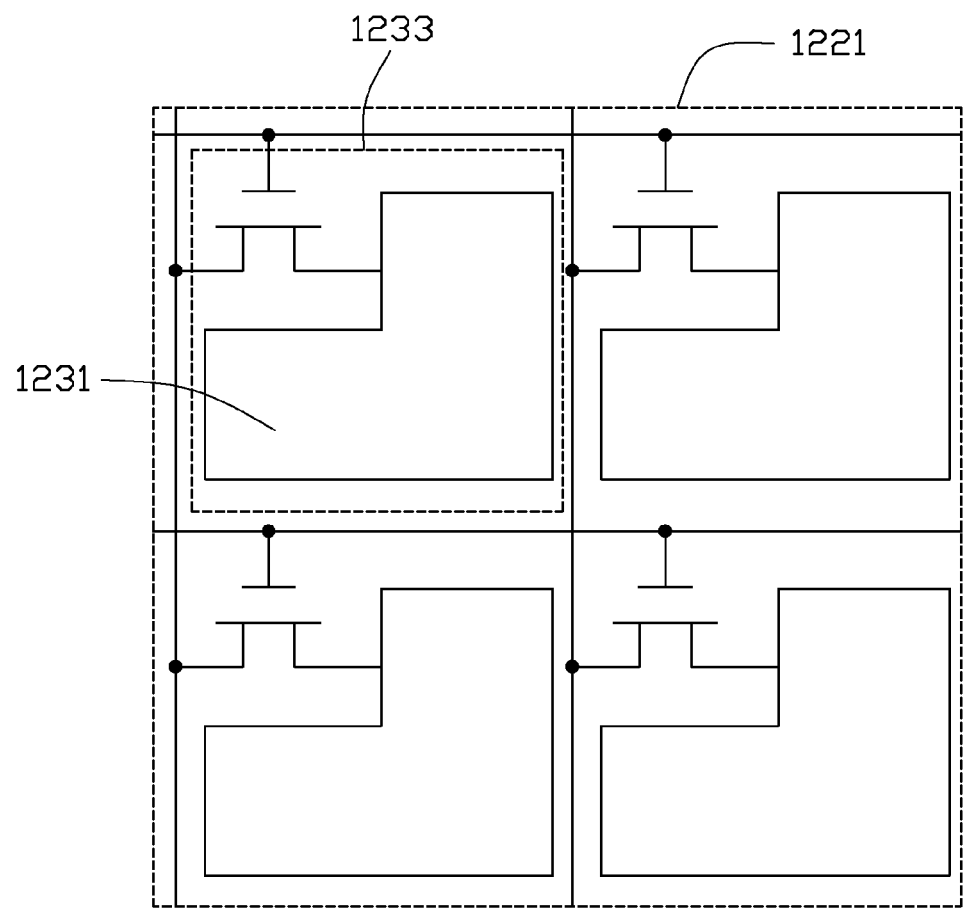
FIG. 4 shows a relationship between a plurality of pixel display areas and a sensing electrode.

Referring to FIG. 4, in at least one embodiment, one sensing electrode 1221 can correspond to four pixel display areas 1233. In the display mode, when the sensing electrodes 1221 receive a common voltage, each sensing electrode 1221 and the pixel electrodes 1231 of the corresponding four pixel areas 1221 can cooperatively induce an electric field for driving corresponding liquid crystals of the liquid crystal layer 130 to rotate within the electric field. In other embodiments, one sensing electrode 1221 can correspond to other numbers of the pixel display areas 1233.

Figure 5:
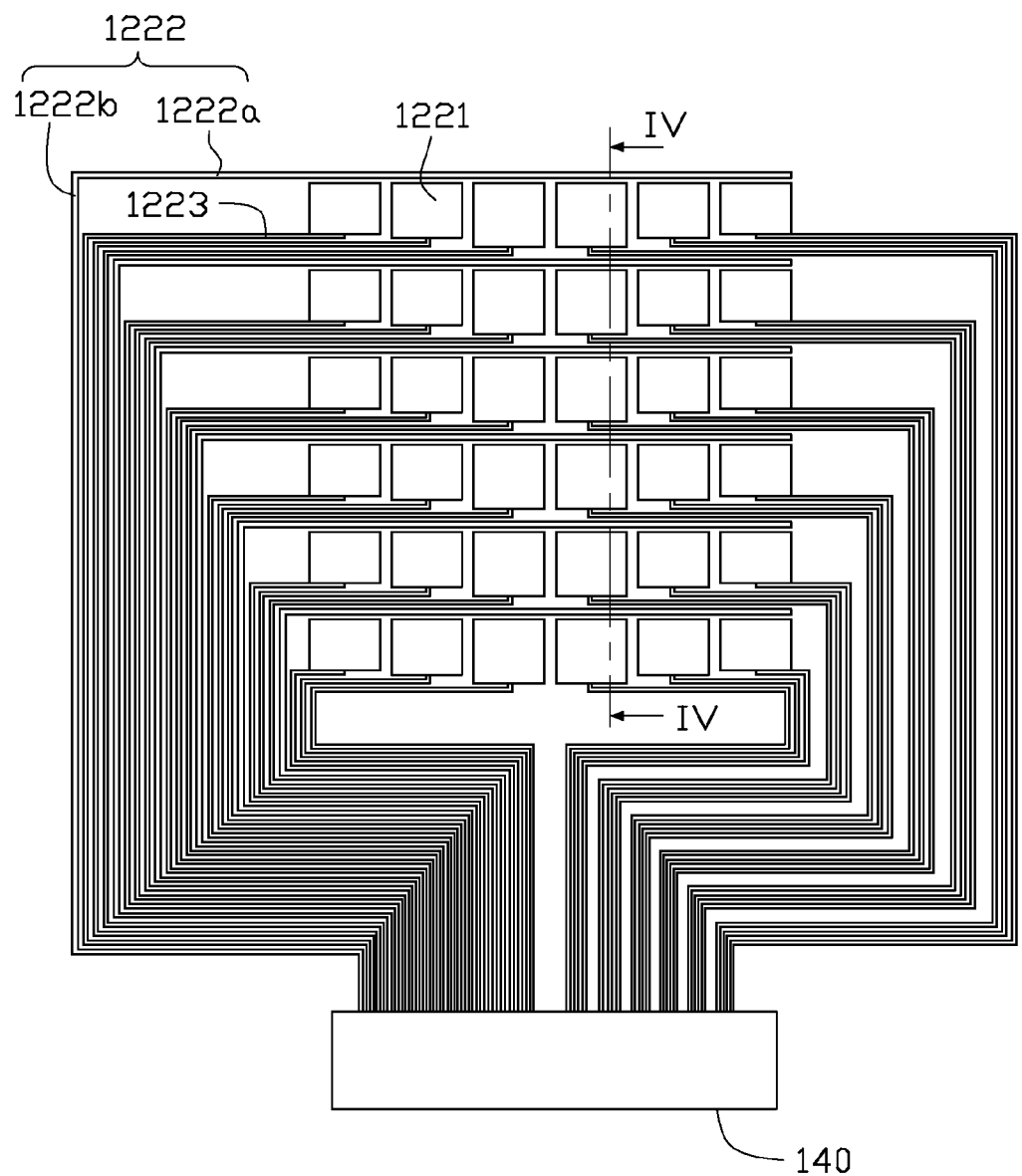
FIG. 5 is a diagrammatic view of an embodiment of a common electrode layer.

Referring to FIG. 5, in at least one embodiment, the plurality of sensing electrodes 1221 can be arranged in a plurality of rows. The common electrode layer 122 can further include a plurality of drive lines, such as a plurality of first drive lines 1222 and a plurality of second drive lines 1223. In at least one embodiment, one first drive line 1222 corresponds to one row of sensing electrodes 1221, and one second drive line 1223 corresponds to one sensing electrode 1221. The first drive lines 1222 and the second drive lines 1223 can be electrically insulated from each other. The first drive lines 1222 can be electrically insulated from the sensing electrodes 1221. The first drive lines 1222 can be electrically insulated from each other. The second drive lines 1223 can be electrically insulated from each other.

Each first drive line 1222 can include a sensing portion 1222a and a connecting portion 1222b. The connecting portion 1222b can electrically couple the sensing portion 1222a to a touch integrated circuit 140. The sensing portion 1222a can be electrically isolated from and located on one side of the corresponding row of sensing electrodes 1221. The sensing portion 1222a and the corresponding row of sensing electrodes 1221 can create a mutually capacitive effect. Each second drive line 1223 can electrically couple the corresponding sensing electrode 1221 to the touch integrated circuit 140. In the touch-sensing mode, the first drive lines 1222 can receive touch scanning signals from the touch integrated circuit 140, and each of the second drive lines 1223 can send a touch sensing signal to the touch integrated circuit 140. The touch integrated circuit 140 can determine touch operations on the corresponding pixel display areas 1233 according to the touch sensing signals.

Figure 6:
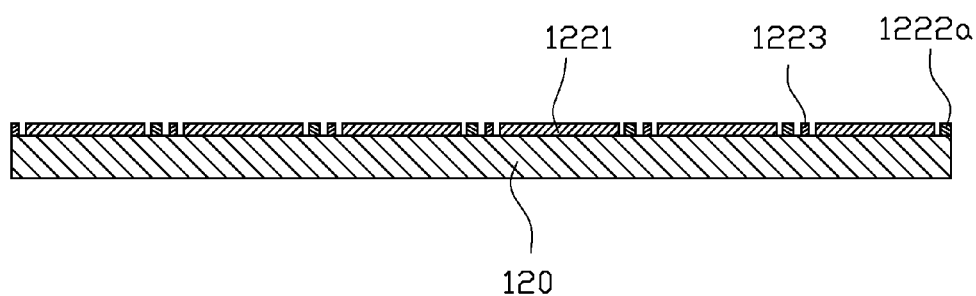
FIG. 6 is a cross-sectional view of FIG. 5 taken along line IV-IV.

Referring to FIG. 6, the rows of sensing electrodes 1221 can be spaced from each other. The sensing portions 1222a of the first drive lines 1222 and the second drive lines 1223 can be arranged on corresponding sides of the rows of sensing electrodes 1221. Thus, the sensing electrodes 1221 and the drive lines 1222, 1223 can be arranged in a same plane of the common electrode layer 122, thereby reducing a required size, i.e., thickness of the display panel structure 100.

In at least one embodiment, the plurality of sensing electrodes 1221 and the plurality of drive lines 1222, 1223 can be formed from a same material during a same manufacturing process of the display panel structure 100. In at least one embodiment, the sensing electrodes 1221 and the drive lines 1222, 1223 can be made of indium tin oxide, and the sensing electrodes 1221 and the drive lines 1222, 1223 can be transparent.

In other embodiments, the plurality of sensing electrodes 1221 and the plurality of pixel display areas 1233 can be arranged in other ways.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including, the full extent established by the broad general meaning of the terms used in the claims.

What is claimed is:

1. An embedded touch-screen display panel structure, comprising:
    a first substrate;
    a second substrate facing the first substrate;
    a liquid crystal layer between the first substrate and the second substrate;
    a common electrode layer formed on the second substrate and located between the second substrate and the liquid crystal layer, the common electrode layer comprising a plurality of sensing electrodes and a plurality of drive lines, each of the plurality of sensing electrodes operable in a display mode and a touch-sensing mode, each of the plurality of sensing electrodes being applied with a common voltage in the display mode; and
    a touch integrated circuit;
    wherein the plurality of drive lines comprises a plurality of first drive lines and a plurality of second drive lines;
    wherein each of the plurality of first drive lines is electrically coupled to the touch integrated circuit and electrically insulated from the plurality of sensing electrodes;
    wherein each of the plurality of second drive lines is electrically coupled between one of the plurality of sensing electrodes and the touch integrated circuit;
    wherein the plurality of first drive lines function as scanning lines configured for receiving touch scanning signals from the touch integrated circuit; the plurality of second drive lines function as sensing lines configured for transmitting touch sensing signals to the touch integrated circuit.

2. The embedded touch-screen display panel structure as in claim 1, wherein
    each of the plurality of first drive lines comprises a sensing portion and a connecting portion;
    each of the plurality of first drive lines corresponds to a predetermined number of sensing electrodes;
    the connecting portion of each of the plurality of first drive lines electrically couples the sensing portion to the touch integrated circuit;
    the sensing portion of each of the plurality of first drive lines is arranged on one side of the corresponding predetermined number of sensing electrodes to create a mutually capacitive effect between the sensing portion and each of the corresponding sensing electrodes.

3. The embedded touch-screen display panel structure as in claim 1, wherein
    the plurality of first drive lines is electrically insulated from each other;
    the plurality of first drive lines is electrically insulated from the plurality of second drive lines; and
    the plurality of second drive lines is electrically insulated from each other.

4. The embedded touch-screen display panel structure as in claim 1, wherein
    the plurality of sensing electrodes is arranged in a plurality of rows; and
    the sensing portion of each of the plurality of first drive lines is arranged on one side of a corresponding row of the sensing electrodes to create the mutually capacitive effect between the sensing portion and each of the sensing electrodes of the row.

5. The embedded touch-screen display panel structure as in claim 4, wherein each of the plurality of rows of sensing electrodes has a first side and a second side opposite to the first side;
    the sensing portion of one of the plurality of first drive lines corresponding to one row of sensing electrodes is located at the first side of the row of sensing electrodes; and
    the plurality of second drive lines electrically coupled to the row of the sensing electrodes is located at the second side of the row of sensing electrodes.

6. The embedded touch-screen display panel structure as in claim 1, wherein the plurality of sensing electrodes and the plurality of drive lines are formed from a same material during a same manufacturing process.

7. The embedded touch-screen display panel structure as in claim 1, wherein the plurality of sensing electrodes and the plurality of drive lines are transparent.

8. The embedded touch-screen display panel structure as in claim 1, further comprising:
- a color filter layer formed on the first substrate and located between the first substrate and the liquid crystal layer;
- a display driver layer comprising a plurality of thin film transistors and located between the second substrate and the common electrode layer;
- a pixel electrode layer comprising a plurality of pixel electrodes and located between the common electrode layer and the liquid crystal layer;
- a first insulating layer located between the display driver layer and the common electrode layer; and
- a second insulating layer located between the common electrode layer and the pixel electrode layer.

* * * * *